(12) United States Patent
Epp et al.

(10) Patent No.: US 10,443,488 B2
(45) Date of Patent: Oct. 15, 2019

(54) SUPERCHARGING DEVICE FOR AN INTERNAL COMBUSTION ENGINE OF A MOTOR VEHICLE, AND METHOD FOR PRODUCING THE SUPERCHARGING DEVICE

(71) Applicant: Continental Automotive GmbH, Hannover (DE)

(72) Inventors: Jakob Epp, Dueren (DE); Andreas Schakies, Nuremberg (DE); Ingo Schulz, Eschweiler (DE); Wolfgang Vitzthum, Ezelsdorf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 518 days.

(21) Appl. No.: 15/102,005

(22) PCT Filed: Dec. 1, 2014

(86) PCT No.: PCT/EP2014/076049
§ 371 (c)(1),
(2) Date: Jun. 6, 2016

(87) PCT Pub. No.: WO2015/086355
PCT Pub. Date: Jun. 18, 2015

(65) Prior Publication Data
US 2016/0305314 A1    Oct. 20, 2016

(30) Foreign Application Priority Data

Dec. 9, 2013  (DE) .................. 10 2013 225 242

(51) Int. Cl.
*F02B 39/06* (2006.01)
*F02B 39/04* (2006.01)
(Continued)

(52) U.S. Cl.
CPC .............. *F02B 39/06* (2013.01); *F02B 39/04* (2013.01); *F02B 39/10* (2013.01); *F04D 17/10* (2013.01);
(Continued)

(58) Field of Classification Search
CPC ......... F02B 39/06; F04D 25/028; F16H 3/727
See application file for complete search history.

(56) References Cited

U.S. PATENT DOCUMENTS

| 8,397,502 B2 | 3/2013 | Barker ............................ 60/608 |
| 2005/0006963 A1 | 1/2005 | Takenaka et al. .............. 310/52 |

(Continued)

FOREIGN PATENT DOCUMENTS

| DE | 602004007626 T2 | 4/2008 | ................ F01P 7/04 |
| JP | 2005110418 A | 4/2005 | ............. B60K 17/04 |

(Continued)

OTHER PUBLICATIONS

International Search Report and Written Opinion, Application No. PCT/EP2014/076049, 22 pages, dated Feb. 6, 2015.

(Continued)

*Primary Examiner* — Mary Davis
(74) *Attorney, Agent, or Firm* — Slayden Grubert Beard PLLC

(57) ABSTRACT

The present disclosure describes a supercharging device for an internal combustion engine of a motor vehicle comprising: a planetary mechanism, a first electric machine, a second electric machine, a compressor impeller, and an internal combustion engine attachment for fastening to a drive output shaft of the internal combustion engine. The first electric machine, the second electric machine and the compressor impeller are connected to one another via the planetary mechanism. Along a longitudinal axis of the supercharging device, the compressor impeller is arranged (Continued)

on a first side of one of the electric machines, and the other of the electric machines is arranged on the second side situated opposite said first side.

7 Claims, 1 Drawing Sheet

(51) Int. Cl.
*F02B 39/10* (2006.01)
*F04D 25/02* (2006.01)
*F04D 17/10* (2006.01)
*F04D 25/06* (2006.01)
*F16H 3/72* (2006.01)

(52) U.S. Cl.
CPC ........... *F04D 25/028* (2013.01); *F04D 25/06* (2013.01); *B60Y 2400/435* (2013.01); *F16H 3/727* (2013.01)

(56) References Cited

U.S. PATENT DOCUMENTS

| | | |
|---|---|---|
| 2007/0149336 A1 | 6/2007 | Sallstrom ..................... 475/5 |
| 2009/0019852 A1 | 1/2009 | Inoue et al. .................. 60/608 |

FOREIGN PATENT DOCUMENTS

| | | | |
|---|---|---|---|
| WO | 2004/072449 A1 | 8/2004 | ................ F01P 7/04 |
| WO | 2006/134330 A1 | 12/2006 | ............. B60K 6/365 |
| WO | 2008/020184 A1 | 2/2008 | ............... B60K 6/24 |
| WO | 2015/086355 A1 | 6/2015 | ............... B60K 6/26 |

OTHER PUBLICATIONS

Korean Office Action, Application No. 2017056488588, 11 pages, dated Aug. 14, 2017.

Chinese Office Action, Application No. 201480066911.2, 15 pages, dated Oct. 31, 2017.

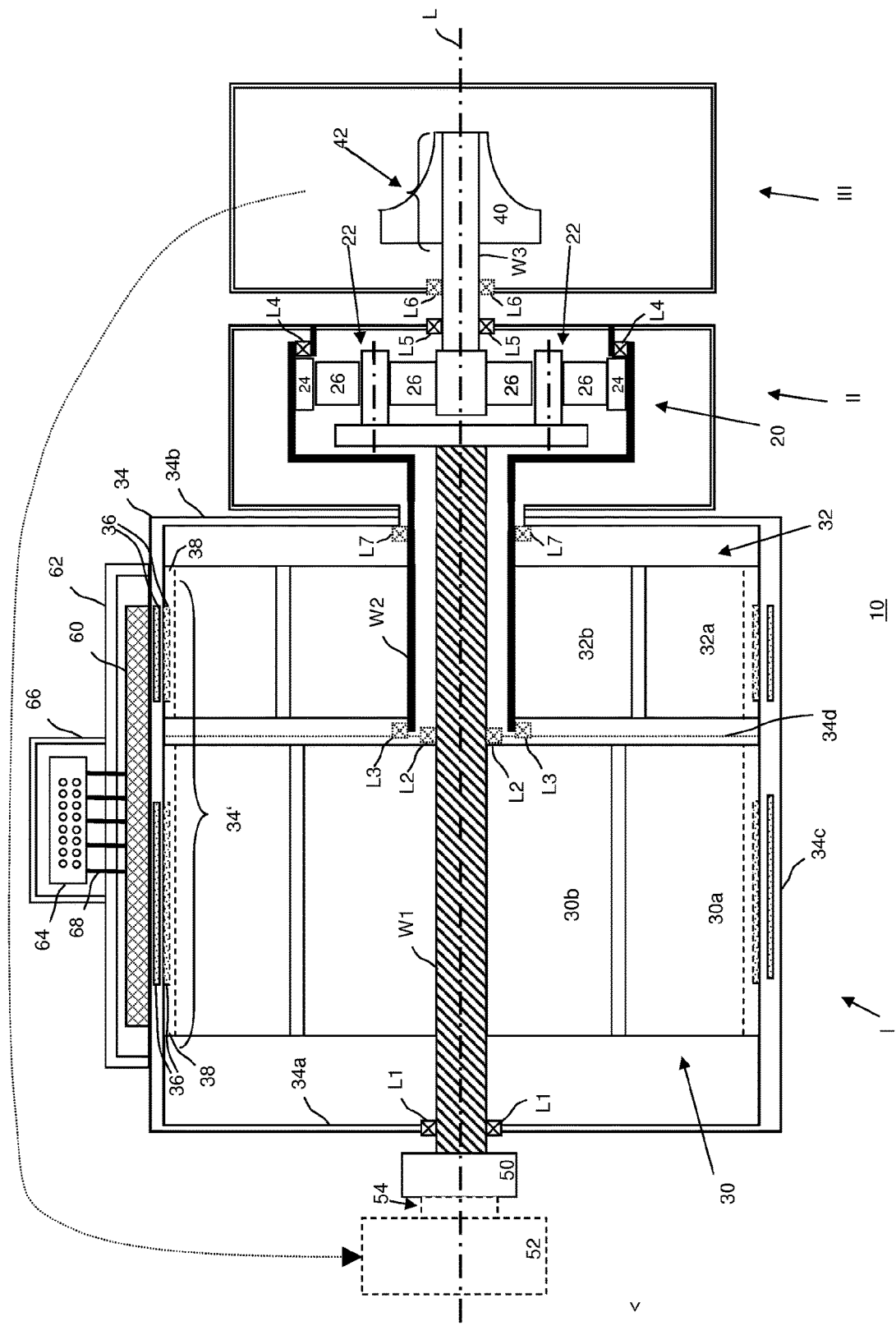

SUPERCHARGING DEVICE FOR AN INTERNAL COMBUSTION ENGINE OF A MOTOR VEHICLE, AND METHOD FOR PRODUCING THE SUPERCHARGING DEVICE

CROSS-REFERENCE TO RELATED APPLICATIONS

This application is a U.S. National Stage Application of International Application No. PCT/EP2014/076049 filed Dec. 1, 2014, which designates the United States of America, and claims priority to DE Application No. 10 2013 225 242.0 filed Dec. 9, 2013, the contents of which are hereby incorporated by reference in their entirety.

TECHNICAL FIELD

The present disclosure relates to internal combustion engines and, in some examples, to supercharging devices for internal combustion engines

BACKGROUND

To increase the power of an internal combustion engine, it is known for the latter to be supercharged by virtue of the mixture for combustion being compressed before being supplied into the combustion chamber. Furthermore, it is already generally known that, to perform the compression, use may be made of energy which is extracted, by way of a turbine, from an exhaust-gas flow of the internal combustion engine or which is supplied by way of an electric motor. Whereas the former possibility gives rise to an undesired lag in the response behavior of the internal combustion engine, in the latter case electrical energy is extracted from an on-board electrical system battery of the vehicle, whereby the battery and the on-board electrical system can be subjected to intense load in an undesired manner.

The document WO 2008/020184 A1 describes a motor vehicle air blower in the case of which, by way of a planetary mechanism, the rotational speed of an internal combustion engine is added to the rotational speed of a first electric machine, while a second electric machine is likewise driven by the internal combustion engine in order to generate the electrical current for the first electric machine. The planetary mechanism adds the two mechanical powers of the internal combustion engine and of the first electric machine, wherein a compressor is operated, with this combined mechanical power, at high rotational speed. It emerges from the cited document that the planetary mechanism is provided between the two electric machines, and furthermore, the two electric machines and the planetary mechanism are accommodated in the same housing.

SUMMARY

It has been identified by the inventors that the known arrangements entail a high production expenditure, in particular during the assembly process. The teachings of the present disclosure may be used to specify an approach with which a supercharging device can be realized in a simpler manner.

In some embodiments, a supercharging device (10) for an internal combustion engine (52) of a motor vehicle may include: a planetary mechanism (20), a first electric machine (30), a second electric machine (32), a compressor impeller (40), and an internal combustion engine attachment (50) designed for fastening to a drive output shaft (54) of the internal combustion engine (52). The first electric machine (30), the second electric machine (32) and the compressor impeller (40) may be connected to one another via the planetary mechanism (20), characterized in that, in a longitudinal axis direction (L) of the supercharging device (10), the compressor impeller (40) is arranged on a first side of one of the electric machines, and the other of the electric machines is arranged on the second side situated opposite said first side.

In some embodiments, the first electric machine is connected to a first shaft (W1), which also has the internal combustion engine attachment (50), and the second electric machine (32) is connected to a second shaft (W2), wherein the first and the second shaft extend concentrically with respect to one another and are connected to the planetary mechanism.

In some embodiments, the first and the second electric machine (30, 32) are arranged between the internal combustion engine attachment (50) and the planetary mechanism (20) in the longitudinal axis direction (L).

In some embodiments, the first and the second electric machine (30, 32) are arranged directly next to one another in the longitudinal axis direction (L), or a coupling element is arranged between the first and the second electric machine (30, 32).

In some embodiments, the first electric machine (30) is provided closer than the second electric machine (32) to the internal combustion engine attachment (50), wherein the second electric machine (32) is connected to the planetary mechanism (20) via a hollow shaft (W2) through which there extends a shaft (W1) which connects the first electric machine (30) to the planetary mechanism (20).

In some embodiments, one of the electric machines (30, 32), in particular the first electric machine (30), is connected to planet wheels (22) of the planetary mechanism (20), and the other of the electric machines (32, 30), in particular the second electric machine (32), is connected to an internal wheel (24) of the planetary mechanism.

In some embodiments, the compressor impeller (40) is connected to a sun wheel (26) of the planetary mechanism (20), preferably directly or in particular via a further mechanism.

In some embodiments, the first and the second electric machine (30, 32) are situated in a motor housing (34), and the compressor impeller (40) is situated on a shaft section (42) which is provided outside the motor housing (34).

In some embodiments, the planetary mechanism (20) is provided outside the motor housing (34), whereas, in particular, actuation electronics (60) of the electric machines (30, 32) are provided on an outer side of a preferably cooled housing section (34') of the motor housing (34), on the inner side of which housing section the first and the second electric machine are situated.

The teachings of the present disclosure may provide a method for producing a supercharging device (10) as described above. The method may comprise connecting the first and the second electric machine (30, 32) to respective shafts (W1, W2), and connecting the respective shafts (W1, W2), to which the first and the second electric machine (30, 32) are connected, to the planetary mechanism (20). For carrying out the step (b), the respective shafts (W1, W2) are brought to the planetary mechanism (20) from the same side of the planetary mechanism (20).

BRIEF DESCRIPTION OF THE DRAWINGS

FIG. 1 shows a symbolic overview of the supercharging device according to the teachings of the present disclosure.

DETAILED DESCRIPTION

It has been identified that, in the case of a supercharging device which has two (or more) electric machines, said electric machines may be next to one another in an axial direction (that is to say next to one another in relation to a longitudinal axis of the supercharging device or of the electric machines). A planetary mechanism to which both electric machines are connected may be situated on one side of one electric machine, whereas the further electric machine is arranged on the other side of the electric machine. In particular, it is provided that the planetary mechanism is not provided between the two electric machines. In other words, two or more electric machines of the supercharging device may be situated on the same side of the planetary mechanism. In this way, the electric machines can be arranged on the planetary mechanism from the same side, giving rise to a considerably simplified construction and production process.

Furthermore, the at least two electric machines are provided on one side of the planetary mechanism, whereas a compressor impeller or an attachment for a compressor impeller of the supercharging device is provided on the other side of the planetary mechanism. In other words, the planetary mechanism may separate the electric machines, on one side, from the compressor impeller, on the other side. This arrangement furthermore may improve cooling, because the compressor impeller is subjected to thermal load by the internal combustion engine and thus separates the planetary mechanism between the electric machines (which are temperature-sensitive) from the compressor impeller. Furthermore, in the attachment of the planetary mechanism to the compressor impeller, thermal insulation can be realized in a simple manner, whereas, in the case of a construction in which the planetary mechanism is provided between electric machines, the compressor impeller transmits heat substantially to at least one of the electric machines, and thus subjects the latter to thermal load.

Therefore, the compressor impeller is arranged on one side of one of the electric machines, whereas the further electric machine is provided on the other side of said electric machine. This configuration may also be described by the statement that the first and the second electric machine, and, in some embodiments, all electric machines of the supercharging device, are provided on one side of the planetary mechanism, whereas the compressor impeller is provided on the other side of the planetary mechanism.

Unless stated otherwise, the specific arrangements or configurations presented here are in relation to an axis of the supercharging device. The arrangements or the configurations relate to an illustration of a section plane in which the axis of the supercharging device lies, or which is parallel to an axis of said type.

Therefore, a supercharging device for an internal combustion engine of a motor vehicle may include a planetary mechanism. The supercharging device also comprises a first electric machine and a second electric machine and a compressor impeller. The supercharging device furthermore comprises an internal combustion engine attachment, e.g., a flange attachment, which is designed to be connected to a shaft of the internal combustion engine or to some other drive shaft which is driven by the internal combustion engine. The internal combustion engine attachment is designed for fastening to a drive shaft of the internal combustion engine. The first electric machine, the second electric machine and the compressor impeller are connected to one another via the planetary mechanism. Such a connection may comprise a direct connection to the planetary mechanism or may comprise a connection which comprises a coupling, a further mechanism, a freewheel, an interlocking means or the like.

One of the electric machines or both electric machines (e.g., in switchable fashion) may be connected to the drive output shaft of the internal combustion engine, such that the respective electric machine and the drive output shaft of the internal combustion engine are seated on the same shaft, which leads to the planetary mechanism. Said electric machine (M) may be connected to the drive output shaft of the internal combustion engine so as to serve, firstly, as a generator which converts power from the internal combustion engine into electrical power, and may secondly serve as a starter which converts electrical power in order to supply this in the form of mechanical power to the internal combustion engine, for example for the purposes of starting the latter. The wording "connected to one another via the planetary mechanism" used herein thus does not mean that all of the components that are connected to one another via the planetary mechanism have to each be provided on individual shafts of the planetary mechanism, but rather it may also be provided that multiple components (in particular the drive output shaft of the internal combustion engine and the first electric machine) are (rigidly) coupled to one another, and the components coupled in this way are connected jointly via the same shaft to the planetary mechanism. Rather, "connected to one another via the planetary mechanism" means that one or more components are provided on an arm of the planetary mechanism, and all components connected via the planetary mechanism are arranged (individually or in sub-groups) on arms of the planetary mechanism).

In a longitudinal axis direction of the supercharging device, the compressor impeller is arranged on a first side of one of the electric machines. The other of the electric machines is arranged on the opposite side (likewise in relation to the longitudinal axis direction). Here, the compressor impeller may be provided on the first side of the second electric machine, whereas the first electric machine is situated on the opposite side of the second electric machine.

Alternatively, the compressor impeller may be provided on a first side of the first electric machine, whereas the second electric machine is situated on the opposite side of the first electric machine. Instead of the abovementioned arrangement of the electric machines and of the compressor impeller, it may also be defined that the compressor impeller is situated on one side of the planetary mechanism, and the first electric machine, the second electric machine or both electric machines are situated on the opposite side of the planetary mechanism in relation thereto. In particular, all of the electric machines of the supercharging device are situated on that side of the planetary mechanism which is situated opposite that side of the planetary mechanism on which the compressor impeller is situated.

The longitudinal axis direction used for the definition of directions may alternatively be the axis of rotation of the first or of the second electric machine, of the compressor impeller or of the internal combustion engine attachment, and an axis of rotation of the planetary mechanism (sun wheel, internal wheel or axis of rotation of a planet wheel group), and/or the axis of rotation of a shaft which provides a mechanical connection to the planetary mechanism.

The first and the second electric machine may be provided in a common module. In a further module which differs therefrom ("second module"), the planetary mechanism is provided, preferably including a bearing through which there leads a shaft to which the compressor impeller is attached. The compressor impeller may be provided in a third module, for example, on the intake tract of the internal combustion engine. Thus, the electric machines, on the one hand, and the planetary mechanism, on the other hand, are provided in different modules. A housing may be provided for each module, such that the electric machines, on the one hand, and the planetary mechanism, on the other hand, are provided in different housings. The housing or module in which the first and the second electric machine are provided may have an intermediate wall, which is situated between the electric machines. The intermediate wall may be used for supporting corresponding shafts to which the respective electric machines are fastened.

In some embodiments of the supercharging device, the first electric machine is connected to a first shaft. The internal combustion engine attachment is also provided on said first shaft. The second electric machine is connected to a second shaft. The first and the second shaft are concentric with respect to one another. Furthermore, the first shaft is connected to the planetary mechanism, and the second shaft is connected to the planetary mechanism, preferably along the same axis of rotation (in particular corresponding to the longitudinal axis direction). The first and the second shaft may thus be regarded as two of three arms of the planetary mechanism, wherein the third arm leads to the compressor impeller. The second shaft may be a hollow shaft, through which the first shaft extends, said first shaft may be in the form of a solid shaft.

The first and the second electric machine are arranged between the internal combustion engine attachment and the planetary mechanism in the longitudinal axis direction. This arrangement definition is a further definition alternative in relation to the arrangement definitions given above regarding the electric machines relative to other components (for example, the planetary mechanism or the compressor impeller or the internal combustion engine attachment). This distribution makes it possible for the electric machines to be arranged close together. Furthermore, different lubrication and cooling types of the planetary mechanism, on the one hand, and of the electric machines, on the other hand, may be implemented without the electric machines requiring individual cooling or lubrication. Rather, it is possible for numerous components and functions to be physically combined, because the first and the second electric machine can be provided with a joint supply. The cabling of the first and the second electric machine may be also simplified in this way, in particular because the first and the second electric machine can be provided with a supply via the same cable duct. The planetary mechanism can be separated off in a simple manner with regard to the lubrication, or is arranged separately from the electric machines.

In some embodiments, it is provided that the first and the second electric machine are arranged directly next to one another in the longitudinal axis direction. An arrangement directly next to one another encompasses an adjacent arrangement without separating bodies, and likewise encompasses an adjacent arrangement in which an intermediate wall separates the two electric machines from one another. The additional spacing resulting from the intermediate wall does not constitute a major obstacle to a compact design, but rather permits simple mounting of the first and/or of the second electric machine. Alternatively, it is also possible for a mechanically acting element, for example a coupling element (or else a mechanism, a coupling, an interlocking means or a freewheel), to be provided between the first and the second electric machine in order to permit, for example, different operating modes of the electric machines. An additional element of said type (and also the intermediate wall) is accommodated in the same module as the electric machines. This yields a module in which all of the electric machines of the supercharging device are accommodated, together with an associated mechanical unit such as the intermediate wall or such as the abovementioned further mechanically acting components, but in particular without planetary mechanism.

Furthermore, it may be provided that the first electric machine is arranged closer than the second electric machine to the internal combustion engine attachment. The second electric machine is connected to the planetary mechanism via a hollow shaft. A shaft which connects the first electric machine to the planetary mechanism extends through said hollow shaft. The hollow shaft, to which the second electric machine is connected, and the shaft to which the first electric machine is connected form, on a side facing toward the planetary mechanism, a mechanical interface to which one side of the planetary mechanism can be attached. The production of the supercharging device is simplified in this way. In particular, the first and the second electric machine can firstly be assembled together with their shafts. In a further step, the planetary mechanism is fastened to the electric machines and their shafts that have been assembled in this way. Between the planetary mechanism, on the one hand, and the electric machines, on the hand, there may thus be provided a wall, in particular of a housing which preferably surrounds both electric machines or surrounds only the first electric machine. Said wall serves for separating off the electric machines with respect to the planetary mechanism. In this way, it is for example possible for a fluid-tight partition to be provided. The electric machines can thus, on one side, form a module, whereas the planetary mechanism and possibly further components may form a further module. The two modules (electric machines on the one hand, planetary mechanism and possibly further components on the other hand) can be connected to one another by way of simple assembly steps.

One of the electric machines, in particular the first electric machine (or else the second electric machine) may be connected to planet wheels of the planetary mechanism. The other of the electric machines, in particular the second electric machine (or else the first electric machine) is connected to an internal wheel of the planetary mechanism. As stated above, the second electric machine may be connected by way of a hollow shaft to the planetary mechanism, whereas a shaft which extends through the hollow shaft connects the first electric machine to the planetary mechanism. Alternatively, it is however also possible for the first electric machine to be connected to the planetary mechanism with a hollow shaft, whereas a shaft which connects the second electric machine to the planetary mechanism extends through the hollow shaft. In the latter arrangement, the second electric machine may be situated closer than the first electric machine to the internal combustion engine attachment in relation to the longitudinal axis direction.

The compressor impeller may be connected to a sun wheel of the planetary mechanism. The compressor impeller is preferably connected to the planetary mechanism directly, in particular via a shaft, and/or via a further mechanism, that is to say indirectly. The connection between sun wheel of the planetary mechanism and compressor impeller is situated on one side of the planetary mechanism, whereas the electric machines are situated on the opposite side of the planetary mechanism. Also, between compressor impeller and planetary mechanism, there may be a wall which separates the compressor impeller from the planetary mechanism, in particular in fluid-tight fashion. The compressor impeller may thus constitute a further module, which is attached to the module which comprises the planetary mechanism. Some embodiments may include a thermal separation between the compressor impeller and the planetary mechanism in order to reduce the introduction of heat via the compressor impeller into the planetary mechanism. Such a thermal separation may also be between the planetary mechanism and the first and/or the second electric machine.

The planet wheels are in engagement with the internal wheel of the planetary mechanism. In this case, the internal wheel extends around the planet wheels. The internal wheel is rotatable and is in particular connected to one of the electric machines (preferably the second electric machine), for example via a hollow shaft. The planet wheels run within the internal wheel. The sun wheel is situated between the planet wheels. The planet wheels are also provided along a closed line (in particular along a circle) which extends around the sun wheel. Likewise, the internal wheel extends around the sun wheel, wherein the planet wheels are situated between the internal wheel and the sun wheel. While the internal wheel is in engagement with the planet wheels, the sun wheel is in engagement with the planet wheels. The planet wheels, the sun wheel and the internal wheel may be in the form of toothed wheels, and possibly also in the form of (friction) wheels, which roll on one another.

In some embodiments, the first and the second electric machine are situated in a motor housing. The motor housing extends substantially all the way around the electric machines, such that the motor housing separates the electric machines from the surroundings of the motor housing and thus also protects the electric machines. At least one cable duct and/or at least one cooling duct may run through the motor housing. The compressor impeller is situated on a shaft section which is situated outside the motor housing. In particular, the shaft section is situated on one side of the planetary mechanism, whereas the motor housing is situated on the opposite side of the planetary mechanism. Said shaft section is a section of a shaft (in particular of a solid shaft) which connects the planetary mechanism to the compressor impeller.

The shaft section has an axis of rotation which corresponds to the axis of rotation of the electric machines and of the hollow shaft and shaft attached thereto. In particular, the axis of rotation of the sun wheel corresponds to the axis of rotation of the shaft or of the hollow shaft to which the electric machines are attached. The individual axes of rotation of the planet wheels are preferably arranged concentrically around said axis of rotation, that is to say concentrically with the axis of rotation of the shaft and of the hollow shaft to which the electric machines are attached. The individual axes of rotation of the planet wheels in turn rotate about a common axis of rotation, which corresponds to the axis of rotation of the shaft and of the hollow shaft which are connected to the electric machines. The central axis of the internal wheel likewise corresponds to the axis of rotation of the shaft and of the hollow shaft to which the electric machines are attached. Likewise, the axis of rotation of the compressor impeller corresponds to the axis of rotation of the hollow shaft and of the shaft to which the electric machines are attached. In some embodiments, the axes of rotation of several or all components of the supercharging device may be in alignment with one another (possibly aside from optionally provided mechanism wheels, couplings or the like).

In some embodiments, the planetary mechanism is outside the motor housing in which the electric machines are situated. Actuation electronics of the electric machines may be on an outer side of a housing section of the motor housing. Said housing section may be cooled, for example by way of at least one cooling duct which leads through said housing section. The first and the second electric machine, in particular the stators thereof, may be situated on the inner side of the housing section, such that they can also be cooled by the housing section.

The housing section may be of unipartite or multi-part form, wherein a first sub-section of the housing section is provided between a first section of the actuation electronics and a stator of one of the electric machines, and a further housing sub-section is between the stator of the other electric machine and a further section of the actuation electronics. In some embodiments, both sub-sections are cooled, and in particular to have at least one cooling duct. The cooling duct may be situated in the wall that forms the housing, or said cooling duct may be situated on an outer or inner side of the housing section, in particular between an inner side of the motor housing and at least one of the electric machines or the brackets thereof, by way of which the respective electric machine is fixed to the motor housing.

The electric machines may each have a stator which extends around a rotor. The respective rotor is connected to the hollow shaft or to the shaft that is connected to the planetary mechanism. The motor housing can be of unipartite or multi-part form and may have an intermediate wall which separates the first electric machine from the second electric machine in the longitudinal axis direction of the supercharging device. The intermediate wall may furthermore serve for the mounting of shaft bearings of the shaft and/or of the hollow shaft, to which the electric machines are connected, relative to the motor housing. In some embodiments, the intermediate wall comprises a counterbearing for rolling bearings which realize the mounting of the shaft and the hollow shaft that are connected to the electric machines. Thus, the intermediate wall realizes the mounting of the rotors of the electric machines in a rotatable manner and/or realizes the (positionally fixed) mounting of the stators.

In some embodiments, the motor housing may have a first face side, which faces toward the internal combustion engine attachment, and may have a second face side, which faces toward the planetary mechanism. The first face side may, by way of a rolling bearing, realize the mounting of one shaft, in particular the shaft to which the first electric machine is attached or the shaft which provides the internal combustion engine attachment. In this way, the first face side of the motor housing realizes the mounting of a shaft which extends from the internal combustion engine attachment into the motor housing. The second face side may likewise realize the mounting of the shaft to which the second electric machine is attached, in particular of the hollow shaft provided for this purpose. For this purpose, a bearing is provided which realizes the rotatable mounting of the second face side relative to the hollow shaft. The face sides realize the mounting of the respective shafts, to which the electric machines are attached, by way of two rolling bearings (one for each face side), whereas the intermediate wall realizes the rotatable mounting of the two shafts by way of a further two rolling bearings.

In some embodiments, the intermediate wall provides a counterbearing for the two rolling bearings which realize the rotatable mounting of the hollow shaft and of the shaft that are connected to the electric machines and in particular to the rotors thereof. This makes it possible to realize a compact construction. The second face side may furthermore have a fastening attachment or a counterbearing for the module which comprises the planetary mechanism, or may realize the mounting of the planetary mechanism itself.

Furthermore, a wall, in particular a wall of a mechanism housing, may be between the planetary mechanism and the compressor impeller. Said wall is situated on a face side, facing toward the compressor impeller, of the mechanism housing. The face side, facing toward the compressor impeller, of the mechanism housing is equipped with a bearing which realizes the rotatable mounting of a shaft which leads from the planetary mechanism (in particular from the sun wheel) to the compressor impeller. The bearing which realizes the mounting of the shaft which leads from the planetary mechanism to the compressor impeller is in particular a bearing with high thermal resistance and is in particular composed of a thermally conductive material in order to dissipate, into the mechanism housing, the heat that is transmitted from the compressor impeller to the shaft. The bearing of the shaft that connects the mechanism to the compressor impeller is in particular a plain bearing. The bearings that realize the mounting of the shafts or hollow shafts to which the electric machines are attached are in particular rolling bearings, preferably ball bearings or roller bearings. Furthermore, the bearings may be in the form of external plain bearings or floating bushings (also referred to as seamless bushings).

Some embodiments may include a method for producing a supercharging device, in particular the supercharging device described here. In a step (a), the first and the second electric machine are connected to the respective shafts. Said shafts correspond to the shaft that connects one electric machine to the planetary mechanism, and the hollow shaft that connects the other electric machine to the planetary mechanism.

In a step (b), which is performed after the step (a), the respective shafts (hollow shaft and shaft extending through said hollow shaft), to which the first and the second electric machine are connected, are connected to the planetary mechanism. Here, said shafts are connected to the planetary mechanism from one side of the planetary mechanism, wherein the other side of the planetary mechanism is connected to the compressor impeller, in particular to a housing in which the compressor impeller is situated. For carrying out the step (b), the respective shafts are brought to the planetary mechanism from the same side of the planetary mechanism. In this way, the electric machines are connected to the planetary mechanism by way of one simple assembly step. In a further assembly step, the planetary mechanism, together with the electric machines already assembled thereon, can be connected to the compressor impeller.

In some embodiments, the electric machines are firstly installed in the motor housing. Shafts project out of the motor housing to both sides (in the longitudinal axis direction), which shafts are firstly connected to the planetary mechanism or to the housing of the planetary mechanism. Here, the planetary mechanism is already installed in the mechanism housing. After the planetary mechanism or the housing thereof has been connected to the motor housing and to the electric machines, the compressor impeller can be attached, or the supercharging device can be installed on the internal combustion engine.

Thus, the method provides for the electric machines, including their shafts (connected thereto), to firstly be assembled, wherein subsequently, the shafts that are connected to the electric machines are connected to the planetary mechanism, in particular to the planet wheels and to the internal wheel. The compressor impeller may be connected to the planetary mechanism, in particular to the sun wheel of the planetary mechanism, before or after the connection of the electric machines to the planetary mechanism.

Thus, the modular construction of the supercharging device permits a simple production process. Firstly, the module of the electric machines (including the shafts) is produced, wherein subsequently, said module of the electric machines is connected to the module that comprises the planetary mechanism. Here, the compressor impeller may already be attached to the planetary mechanism. Alternatively, the compressor impeller may be fastened to the module of the planetary mechanism after the assembly of the module of the planetary mechanism with the module of the electric machine. In particular, it is also possible for the compressor impeller to be provided in a module, preferably including a bearing arrangement for a shaft that leads to the compressor impeller. Here, the module of the compressor impeller can be easily attached to the module of the mechanism (before or after the assembly of the module of the electric machine with the module of the planetary mechanism). The module of the electric machines may also be referred to as first module, the module of the planetary mechanism may also be referred to as second module, and the module of the compressor impeller may also be referred to as third module.

The example supercharging device 10 illustrated in FIG. 1 is provided for an (optional) internal combustion engine 52, which is supercharged by way of a compressor impeller 40, see the dotted arrow which represents the functional relationship. The supercharging device 10 comprises a planetary mechanism 20, a first electric machine 30 and a second electric machine 32. Furthermore, the compressor impeller 40 is part of the supercharging device. The supercharging device furthermore comprises an internal combustion engine attachment 40, to which an internal combustion engine 52 can be attached via a drive output shaft 54 of the internal combustion engine.

The first electric motor 30 comprises a stator 30a and a rotor 30b which is surrounded by the stator 30a. The second electric machine 32 also comprises a rotor 32a, which extends around a rotor 32b. Whereas the first electric motor 30 is attached to a shaft W1 which leads to the planetary mechanism 20, the second motor is connected via a hollow shaft W2 to the planetary mechanism 20. Here, the shaft W1 extends through the shaft W2. The first electric motor 30 is connected via the shaft W1 to a different arm of the planetary mechanism 20 than the second electric machine 32. In particular, the second electric motor 32 is connected via the shaft W2 to an internal wheel 24 of the planetary mechanism, whereas the first electric motor is connected via the shaft W1 to the planet wheels 22 that engage into the internal wheel 24. A sun wheel 26 of the planetary mechanism 20, which is likewise in engagement with the planet wheels 22, is connected via a shaft W3 to the compressor impeller 40. The shafts W1, W2 and W3 are all situated along the same axis, which corresponds to the longitudinal axis direction L of the supercharging device 10.

The first and the second electric motor 30, 32 are situated on one side of the planetary mechanism 20 (in the longitudinal axis direction L), whereas the compressor impeller 40 is situated on the opposite side of the planetary mechanism 20. The compressor impeller 40 is provided on a shaft section 42 which is situated on one side of the planetary mechanism 20, whereas the electric machines 30, 32 are situated on the other side of the planetary mechanism.

The electric machines 30, 32 may be grouped as a first module I, which is situated on one side of a second module II, which comprises the planetary mechanism. The compressor impeller may be part of the second module, though may also, as illustrated in FIG. 1, be grouped as a third module III, in particular on that side of the second module II which is situated opposite that side of the second module II on which the first module I is situated.

The first module I may also be referred to as motor module, whereas the module II may be regarded as mechanism module. Furthermore, the third module III may be regarded as compressor module, wherein the second and the third module may also be integrated to form a common module. It can be seen from FIG. 1 that the first module is fastened only on one side to the second module, whereas the opposite side of the second module serves for the fastening of the compressor impeller in particular of the third module. This thus yields a particularly simple construction.

Each module may comprise a dedicated housing, wherein the first module I may in this case comprise a motor housing, the second module II may comprise a mechanism housing, and the third module III may comprise a compressor housing. As already stated, the planetary mechanism and the compressor impeller may be provided in the same housing, wherein, in particular, an intermediate wall may be provided between the planetary mechanism 20 and the compressor impeller 40.

The first electric machine 30 and the second electric machine 32 are arranged in a common motor housing 34, and the latter may be provided in three parts, with a face side 34a facing toward the internal combustion engine attachment 50. The motor housing corresponds to the first module or to the housing of the first module. A second face side 34b of the motor housing 34 is situated on the opposite side of the motor housing 34, in particular on a side which faces toward the planetary mechanism 20 (or toward the compressor impeller 40). A housing shell 34c extends around the first and the second electric motor 30, 32 in a circumferential direction of the motors, and connects the first face side 34a to the second face side 34b. The housing shell 34c forms, together with the face sides 34a and 34b, a substantially closed housing 34. An optional intermediate wall 34d divides the interior of the housing 34 into two sections in the longitudinal axis direction L, wherein one of the two electric machines 30, 32 is provided in each section.

The intermediate wall may furthermore serve as a fastening for one or more bearings which realize the rotatable mounting of the shaft(s). The housing shell and the face sides that close off the latter form a substantially cylindrical shape (aside from the electronics, and the associated housing section, described further below). The cross section of the cylindrical shape may be substantially circular, or else may be polygonal, and in particular rectangular or square, with preferably rounded corners.

In the first face side 34a of the motor housing 34 there is an opening through which the shaft W1 extends (from the internal combustion engine attachment into the interior of the motor housing 34), wherein the first face side 34a of the housing 34 realizes the mounting of said shaft W1 by way of a bearing L1. The intermediate wall 34d furthermore serves as a fastening for a further bearing L2 which realizes the mounting of the same shaft W1 in the interior of the housing 34. The intermediate wall furthermore serves for the fastening of a bearing L3 which realizes the rotatable mounting of the hollow shaft in the interior of the housing 34, wherein the hollow shaft W2 is connected to the second electric machine. Bearings may also be provided in the second face side 34b, for example for the mounting of the shaft W1 and/or for the mounting of the shaft W2. The shaft W1 extends through the entire motor housing 34 from the internal combustion engine attachment 50 (outside the motor housing 34, on one side of the motor housing 34) as far as the planetary mechanism 20 (on a second side of the motor housing 34, which second side is situated opposite the internal combustion engine attachment).

The second module II, and in particular the planetary mechanism 20, are situated on that side of the motor housing 34 which is situated opposite the internal combustion engine attachment 50. Here, the shaft W2, which is in the form of a hollow shaft and which is connected to the second electric machine, is connected to the internal wheel 24 of the planetary mechanism. The shaft W1, which is connected to the first electric machine 30, is connected to the planet wheels or to the axles of the planet wheels 22. The shaft W2 extends from the second electric machine 32, to which said shaft is connected, as far as the internal wheel 24 of the planetary mechanism. Here, the hollow shaft W2 extends through the second face side 34b. If the planetary mechanism 20 is provided in a mechanism housing, as illustrated in FIG. 1, then the shaft W2 also extends through a face side, facing toward the motor housing or toward the electric machines, of the mechanism housing. In the same way, the shaft W1, which is connected to the first electric machine 30, extends through that face side of the mechanism housing which faces toward the electric machines. That face side of the mechanism housing which faces toward the electric machines, and that face side 34b of the motor housing which faces toward the planetary mechanism 20, preferably directly adjoin one another. In a preferred embodiment, the face side 34b of the motor housing 34 and that face side of the mechanism housing which faces toward the electric machine are identical, and are formed by a single wall. Furthermore, the housing shell of the motor housing may extend further in the longitudinal axis direction toward the compressor, and may thus also extend around the planetary mechanism in a circumferential direction.

A bearing L4 realizes the rotatable mounting of the internal wheel 24. Furthermore, a bearing L5 realizes the, likewise rotatable, mounting of a shaft W3 which is connected to the sun wheel 26. The bearings L4 and L5 may be supported by a housing face side which separates the planetary mechanism 20 from the compressor impeller 40. Said face side is in particular a face side, situated on that side of the planetary mechanism 20 which is averted from the electric machines 30, 32, of the mechanism housing. Said face side may furthermore be fastened to the housing shell 34c, if the housing shell also extends in a circumferential direction around the planetary mechanism 20. The compressor impeller 40 may be provided in a compressor housing, as illustrated in FIG. 1, wherein the compressor housing is provided separately from the mechanism housing. However, the compressor impeller 40 may be provided in the same housing as the planetary mechanism 20, wherein preferably, a (further) intermediate wall separates the compressor impeller from the planetary mechanism in the longitudinal axis direction L. A further bearing L6 may be provided in a face side of the compressor housing in which the compressor impeller is situated, wherein said face side faces toward the planetary mechanism 20. Furthermore, the bearing L6 which is situated in a face side of the compressor housing may replace the bearing L5 which is provided in a face side of the mechanism housing. Furthermore, the compressor impeller may also be rotatably mounted within the housing by one bearing, wherein in particular, the bearings L5 and L6 may be omitted in this case.

A bearing L7 realizes the rotatable mounting of the shaft W2 relative to the face side 34b of the motor housing. Alternatively, a bearing realizes the rotatable mounting of the shaft W2 relative to the mechanism housing, in particular relative to a face side, facing toward the electric machines, of the mechanism housing.

The shaft W3, which connects the sun wheel 26 of the planetary mechanism 20 to the compressor impeller 40, extends through an intermediate wall between the compressor impeller and the planetary mechanism, or through a face side, facing toward the compressor impeller, of the mechanism housing, and/or through a face side, facing toward the planetary mechanism 20, of the compressor housing. The shaft section 42 of the shaft W3 (which connects the sun wheel 26 to the compressor impeller 40) extends within the mechanism housing or within a housing section in which the compressor impeller 40 is situated. The compressor impeller 40 is fastened to said shaft section 42.

The motor housing 34, and in particular the housing shell 34c, has a housing section 34' which is cooled. Here, a cooling duct 36 (at least one cooling duct 36) may be provided within the housing shell. Alternatively, a cooling housing is provided on the inner side of the housing section 34'. Said cooling housing is formed by the inner side of the housing section 34' or of the housing shell provided there, and by a fastening element 38 by way of which the first electric motor 30 and/or the second electric motor 32 is in contact with the inner side of the motor housing 34 (or the housing section 34'). Here, it is for example possible for the fastening element 38 to have an external encircling groove which, together with the inner side of the motor housing 34, forms a cooling duct. Furthermore, ports for the external attachment of the cooling duct may be provided in the housing.

In some embodiments, actuation electronics 60 of the motors 30 and are provided on an outer side of the motor housing, in particular on the outer side of the housing shell and preferably on the outer side of the housing section 34'. The actuation electronics 60 are preferably situated so as to be thermally connected to the housing section and in particular so as to be in physical contact with the housing section 34', in order that the actuation electronics 60 can also be cooled. It is pointed out that the fastening element 38 may be thermally conductive, such that the electric machines 30, 32 can be cooled by way of the cooling ducts.

The actuation electronics 60 are provided in an electronics housing which is arranged on the outer side of the motor housing 34, in particular on the housing shell 34c or on the housing section 34'. The electronics housing 62 thus defines an additional interior, which is separated from the interior of the motor housing 34 (by way of the housing section 34'). Cables may extend between the actuation electronics 60 and the interior of the motor housing 34 in order to connect the actuation electronics 60 to the electric motors 30, 32. In particular, the housing shell 34c has an opening through which lines can extend.

In some embodiments, the electronics housing 62 may have an opening through which lines 68 can extend to a plug connector 64, which in turn is situated in a dedicated (open) plug housing 66. The plug housing 66 is open in a receiving direction of the plug connection in order that a plug can be inserted. The plug connection 64 comprises a multiplicity of pins or sockets which are arranged preferably in one or multiple rows in order to make it possible to realize an electrical plug connection in the conventional manner.

The actuation electronics 60 may comprise power electronics, in particular power switches such as MOSFETs, transistors in general or else thyristors, by way of which the power flow to and from the electric machines can be controlled. The actuation electronics may comprise control circuits for the control of the power switches provided in the actuation electronics 60.

The electric machines 30 and 32 may be externally excited, self-excited or permanent-magnet-excited electric machines, in particular direct-current machines or else synchronous machines.

The first electric machine may serve as a starter for the internal combustion engine 52, and may also serve as a generator which is operated by the internal combustion engine 52. Thus, the first electric machine is a starter-generator. The second electric machine may be a motor by way of which an additional rotational speed can be generated at the internal wheel 24, which additional rotational speed is added to the rotational speed of the shaft W1 in order to drive the compressor impeller 40 at the summed rotational speed. The second electric machine 32 may possibly also be used as a generator. It is possible for the first electric machine to be realized and attached as a motor, as a motor/generator, or as a generator, wherein this also applies to the second electric machine independently of the first electric machine.

The supercharging device illustrated in FIG. 1 schematically shows that the first and the second electric machine are provided on a different side of the planetary mechanism than the compressor impeller. FIG. 1 shows merely a schematic, simplified construction, wherein couplings, freewheels or mechanisms that may be provided, which have hitherto not been described on the basis of FIG. 1, may likewise be provided in the supercharging device. Said further components however do not change the basic design, in which both (or generally all or at least two) of the electric machines of the supercharging device are provided on the same side of the planetary mechanism.

The housings illustrated in FIG. 1 are illustrated as being spaced apart from one another in the longitudinal axis direction, in particular for a better overview and for better identifiability of the modular construction. The housings may directly adjoin one another (or merge into one another), wherein in particular, face sides which face directly toward one another may also be of unipartite form. For example, the face side 34b and that face side of the mechanism housing which faces toward the electric machines may be realized by a single housing wall. Said housing wall may be a face-side housing wall of the motor housing or of the mechanism housing. Likewise, those face sides of the mechanism housing and of the compressor housing which face toward one another may be realized as a single housing wall. Said housing wall may be a face-side housing wall of the mechanism housing or of the compressor housing.

LIST OF REFERENCE DESIGNATIONS

10 Supercharging device
20 Planetary mechanism
22 Planet wheels
24 Internal wheel
26 Sun wheel
30, 32 First, second electric machine 30*a*, 32*a* Stator of the first/of the second electric machine
30*b*, 32*b* Rotor of the first/of the second electric machine
34 Motor housing
34' Housing section of the motor housing
34*a* Face side of the motor housing 34, facing toward the internal combustion engine or the internal combustion engine attachment
34*b* Face side of the motor housing 34, facing toward the planetary mechanism 20
36 Cooling ducts in or on the motor housing
38 Fastening element for the fastening of the electric machines to the motor housing
40 Compressor impeller
42 Shaft section fastened to the compressor impeller 40
50 Internal combustion engine attachment
52 Internal combustion engine
54 Drive output shaft of the internal combustion engine 52
60 Actuation electronics
62 Electronics housing
64 Plug connection
66 Plug connection housing
68 Lines
L1-L7 Bearings for shafts W1 to W3 and for internal wheel 24
W1 Shaft, fastened to the first electric machine
W2 Hollow shaft, fastened to the second electric machine
W3 Shaft, connects sun wheel 26 to compressor impeller 40
I First module, or motor module
II Second module, or mechanism module
III Third module, or compressor module
L Longitudinal axis direction, or axis of rotation, of the shafts W1, W2 and W3

What is claimed is:

1. A supercharging device for an internal combustion engine of a motor vehicle, the supercharging device comprising:
    a planetary mechanism including planet wheels, an internal wheel, and a sun wheel,
    a first electric machine driving the planet wheels,
    a second electric machine driving the internal wheel,
    a compressor impeller connected to the sun wheel, and
    an internal combustion engine attachment for fastening to a drive output shaft of the internal combustion engine,
    wherein the first electric machine, the second electric machine and the compressor impeller are connected to one another via the planetary mechanism,
    the first electric machine and the second electric machine are arranged between the internal combustion engine attachment and the planetary mechanism in the longitudinal axis direction; and
    in the longitudinal axis direction of the supercharging device, the compressor impeller is arranged on a first side of one of the electric machines, and the other of the electric machines is arranged on the second side situated opposite said first side.

2. The supercharging device as claimed in claim 1, further comprising a first shaft and a second shaft extending concentrically with respect to one another and both connected to the planetary mechanism, wherein
    the first electric machine is connected to the first shaft,
    the internal combustion engine attachment is connected to the first shaft, and
    the second electric machine is connected to the second shaft.

3. The supercharging device as claimed in claim 1, wherein the first and the second electric machine are arranged directly next to one another in the longitudinal axis direction, or a coupling element is arranged between the first and the second electric machine.

4. The supercharging device as claimed in claim 1, wherein:
    the first electric machine is closer than the second electric machine to the internal combustion engine attachment,
    the second electric machine is connected to the planetary mechanism via a hollow shaft through which there extends a shaft which connects the first electric machine to the planetary mechanism.

5. A supercharging device as claimed in claim 1, wherein the first and the second electric machine are situated in a motor housing, and the compressor impeller is situated on a shaft section which is disposed outside the motor housing.

6. The supercharging device as claimed in claim 5, wherein:
    the planetary mechanism is outside the motor housing, and
    actuation electronics of the first and the second electric machines are provided on an outer side of a housing section of the motor housing, on the inner side of which housing section the first electric machine and the second electric machine are situated.

7. A method for producing a supercharging device having a first electric machine, a second electric machine, a compressor impeller, an internal combustion engine attachment for fastening to a drive output shaft of the internal combustion engine, and a planetary mechanism including planet wheels, an internal wheel, and a sun wheel, the method comprising:
    connecting the first electric machine to a first shaft for driving the planet wheels;
    connecting the second electric machine to a second shaft driving the internal wheel; and
    connecting the compressor impeller to the sun wheel;
    wherein the first and second shafts are brought to the planetary mechanism from the same side of the planetary mechanism;
    wherein in the longitudinal axis direction of the supercharging device, the compressor impeller is arranged on a first side of one of the first and second electric machines, and the other of the first and second electric machines is arranged on the second side situated opposite of said first side;
    wherein the first and the second electric machine are arranged between the internal combustion engine attachment and the planetary mechanism in the longitudinal axis direction.

* * * * *